United States Patent
Cui et al.

(10) Patent No.: US 12,471,481 B2
(45) Date of Patent: Nov. 11, 2025

(54) DISPLAY MODULE AND DISPLAY DEVICE

(71) Applicant: BOE Technology Group Co., Ltd., Beijing (CN)

(72) Inventors: Yue Cui, Beijing (CN); Yuehan Wei, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 109 days.

(21) Appl. No.: 17/911,247

(22) PCT Filed: Nov. 2, 2021

(86) PCT No.: PCT/CN2021/128119
§ 371 (c)(1),
(2) Date: Sep. 13, 2022

(87) PCT Pub. No.: WO2022/205895
PCT Pub. Date: Oct. 6, 2022

(65) Prior Publication Data
US 2024/0215376 A1  Jun. 27, 2024

(30) Foreign Application Priority Data
Mar. 29, 2021  (CN) .......................... 202110336950.1

(51) Int. Cl.
*G06F 1/16* (2006.01)
*H10K 59/80* (2023.01)
*H10K 102/00* (2023.01)

(52) U.S. Cl.
CPC ....... *H10K 59/80* (2023.02); *H10K 2102/311* (2023.02)

(58) Field of Classification Search
CPC ....... G09F 9/301; G06F 1/1616; G06F 1/1652
See application file for complete search history.

(56) References Cited

U.S. PATENT DOCUMENTS 9,515,099 B2 * 12/2016 Kwon ................ H10D 86/0212
12,185,517 B2 * 12/2024 Zhang ................... G06F 1/1652
(Continued)

FOREIGN PATENT DOCUMENTS

CN  107275371 A  10/2017
CN  108665804 A  10/2018
(Continued)

OTHER PUBLICATIONS

Office Action dated Dec. 22, 2021, issued in counterpart CN application No. 202110336950.1, with English translation. (16 pages).

(Continued)

*Primary Examiner* — Anthony Q Edwards
(74) *Attorney, Agent, or Firm* — WHDA, LLP

(57) ABSTRACT

A display module and a display device. The display module includes: a flexible display panel (61), wherein the flexible display panel (61) includes an active area (AA) and a bending area (BB) located at a periphery of the active area (AA); a supporting layer (62) disposed on one side of the active area (AA), and the supporting layer (62) is disposed away from a light-emitting side of the flexible display panel (61); wherein, the supporting layer (62) is provided with an isolation groove (63) extending through the supporting layer (62) in a first direction, and the isolation groove (63) is disposed close to the bending area (BB) for isolating the supporting layer (62) on both sides of the isolation groove (63), and the first direction is perpendicular to a thickness direction of the supporting layer (62) and a bending axis (X) of the bending area (BB).

18 Claims, 5 Drawing Sheets

(56) References Cited

U.S. PATENT DOCUMENTS

| | | | |
|---|---|---|---|
| 2017/0294609 A1 | 10/2017 | Namkung | |
| 2018/0026212 A1* | 1/2018 | Hasegawa | H10K 59/12 257/40 |
| 2021/0157431 A1 | 5/2021 | Gu et al. | |
| 2021/0265590 A1 | 8/2021 | Wang et al. | |
| 2022/0157205 A1 | 5/2022 | Chen | |
| 2022/0310964 A1* | 9/2022 | Xia | H10K 50/87 |
| 2022/0312654 A1 | 9/2022 | Zhang et al. | |
| 2022/0396050 A1 | 12/2022 | Zhu | |

FOREIGN PATENT DOCUMENTS

| | | |
|---|---|---|
| CN | 110197620 A | 9/2019 |
| CN | 110890025 A | 3/2020 |
| CN | 111312660 A | 6/2020 |
| CN | 111462634 A | 7/2020 |
| CN | 111667759 A | 9/2020 |
| CN | 111766970 A | 10/2020 |
| CN | 112150929 A | 12/2020 |
| CN | 113066382 A | 7/2021 |
| TW | 201837578 A | 10/2018 |

OTHER PUBLICATIONS

Office Action dated May 19, 2022, issued in counterpart CN application No. 202110336950.1, with English translation. (22 pages).

* cited by examiner

DISPLAY MODULE AND DISPLAY DEVICE

CROSS REFERENCE TO RELEVANT APPLICATIONS

The present disclosure claims the priority of the Chinese patent application filed on Mar. 29, 2021 before the Chinese Patent Office with the application number of 202110336950.1 and the title of "DISPLAY MODULE AND DISPLAY DEVICE", which are incorporated herein in its entirety by reference.

TECHNICAL FIELD

The present disclosure relates to the technical field of display and, more particularly, to a display module and a display device.

BACKGROUND

With the prosperous development of science and technology, mass production and productization of the flexible panel are gradually realized. At present, flexible panels in various forms, such as foldable and rollable, are hot sold, which brings a new terminal experience for consumers. At present, there is also a solution of a flexible cell matched with the flexible display module. By regionalizing the cell, the electronic device has the characteristics of local or overall flexibility.

Because the flexible display panel is soft, a supporting layer is usually disposed on one side of the flexible panel to improve the support performance of the panel and protect the flexible panel. However, in practical applications, the display panel which is foldable or rollable often emerges poor display.

SUMMARY

The present disclosure provides a display module, wherein the display module includes:
  a flexible display panel, wherein the flexible display panel includes an active area and a bending area located at a periphery of the active area; and
  a supporting layer disposed on one side of the active area, and the supporting layer is disposed away from a light-emitting side of the flexible display panel; wherein, the supporting layer is provided with an isolation groove extending through the supporting layer in a first direction, and the isolation groove is disposed close to the bending area for isolating the supporting layer on both sides of the isolation groove, and the first direction is perpendicular to a thickness direction of the supporting layer and a bending axis of the bending area.

In an optional embodiment, an extension direction of the isolation groove is perpendicular to the first direction.

In an optional embodiment, an extension trajectory line of the isolation groove is a curve.

In an optional embodiment, a filler is disposed in the isolation groove, and an elastic modulus of the filler is less than an elastic modulus of the supporting layer.

In an optional embodiment, a material of the filler comprises silica gel.

In an optional embodiment, a distance between the isolation groove and the bending area is greater than or equal to 7 mm and less than or equal to 15 mm.

In an optional embodiment, a width of the isolation groove is greater than or equal to 1 mm along the first direction of the flexible display panel.

In an optional embodiment, an edge of the supporting layer close to the bending area is retracted relative to an edge of the active area close to the bending area, and a retracted amount is less than or equal to 0.5 mm.

In an optional embodiment, an edge of the supporting layer close to the bending area is protruded relative to an edge of the active area close to the bending area, and a protruded amount is less than or equal to 0.5 mm.

In an optional embodiment, a thickness of the supporting layer is greater than or equal to 30 μm, and less than or equal to 50 μm.

In an optional embodiment, a material of the supporting layer is a metal, and a material of the metal is a stainless steel or a shape memory alloy.

In an optional embodiment, a bending radius of the bending area is less than or equal to 400 μm.

The present disclosure provides a display device, wherein the display device includes the display module according to any one of embodiments described above.

The above description is merely a summary of the technical solutions of the present disclosure. In order to more clearly know the elements of the present disclosure to enable the implementation according to the contents of the description, and in order to make the above and other purposes, features, and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work. It should be noted that the ratios in the drawings are merely illustrative and do not represent actual ratios.

DETAILED DESCRIPTION OF THE EMBODIMENTS

In order to make the objects, the technical solutions, and the advantages of the embodiments of the present disclosure clearer, the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
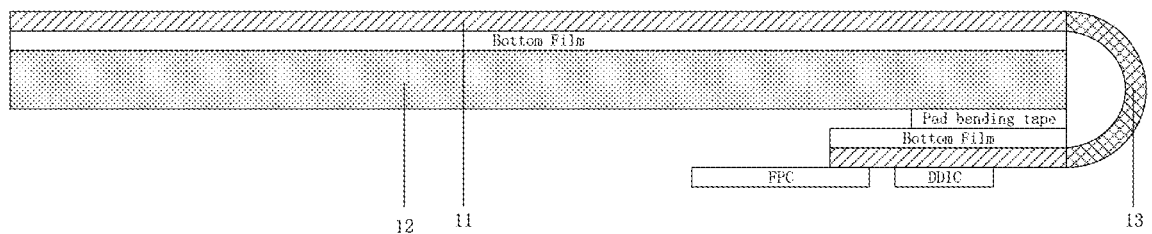
FIG. 1 illustrates a schematic diagram showing a sectional structure of the display module at a non-folded state in the related art.
Figure 2A:
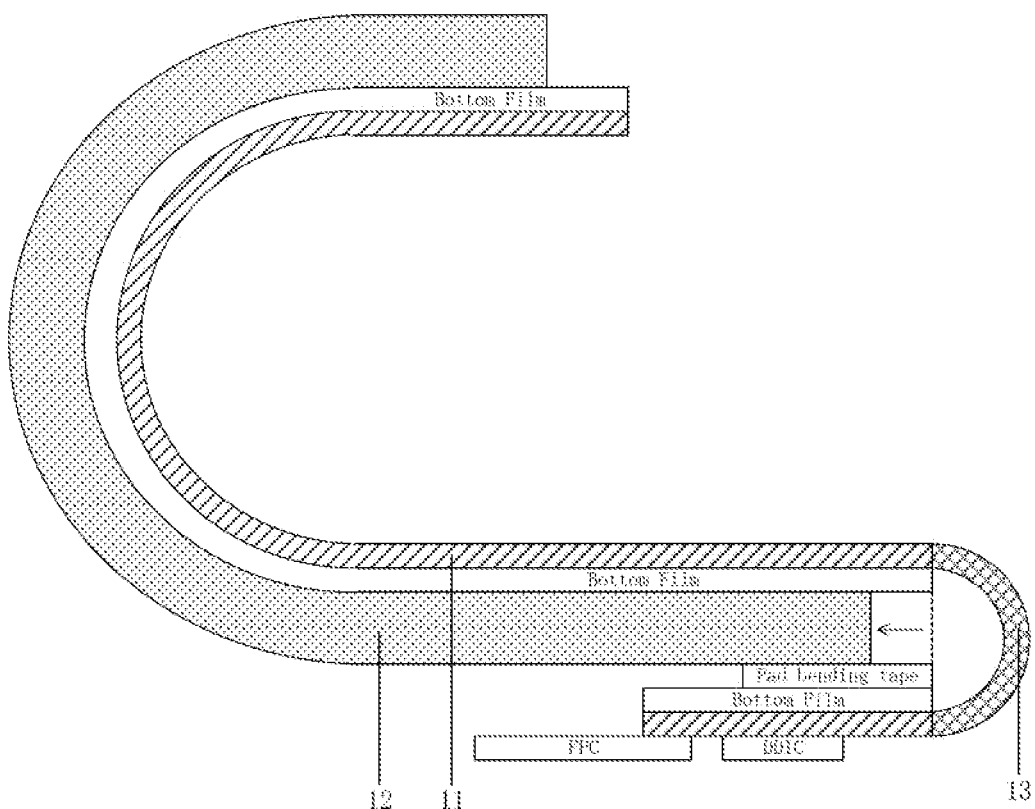
FIG. 2A and FIG. 2B illustrate schematic diagrams showing a sectional structure of the display module at two folded states in the related art.
Figure 2B:
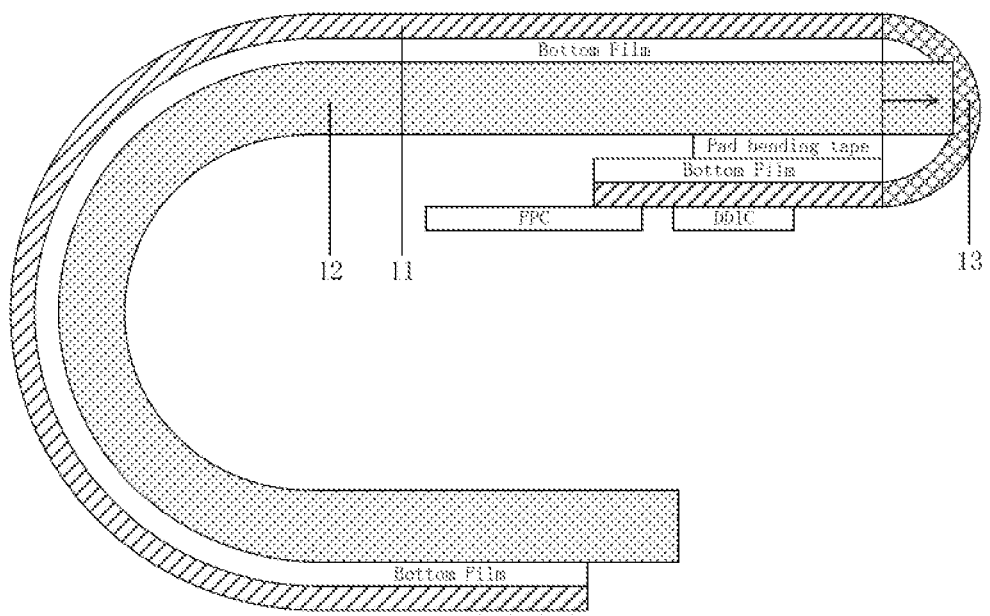

Referring to FIG. 1, FIG. 1 illustrates a schematic diagram showing a sectional structure of the display module at a non-folded state in the related art. FIG. 2A and FIG. 2B illustrate schematic diagrams showing a sectional structure of the display module at two folded states in the related art. By comparing with FIG. 1 and FIG. 2A and FIG. 2B, it can be seen that, with the folding of the display module, the bending radius of the supporting layer 12 in the display module is different from the bending radius of the display panel 11, resulting in the dislocation of the supporting layer 12 relative to the display panel 11. Moreover, the closer to the supporting layer 12, the greater the edge stress accumulation. Thus, the dislocation amount of the supporting layer 12 at the edge position is large. When the supporting layer 12 dislocates too far away from the side of the bending area 13, as shown in FIG. 2A, it may cause insufficient support at the corresponding position of the display panel 11 to collapse. When the supporting layer 12 dislocates toward the bending area 13, as shown in FIG. 2B, if the dislocation amount is equivalent to the bending radius of the bending area 13, the bending area 13 may be damaged by the squeezing of the supporting layer 12, causing poor display risks.

Figure 3:
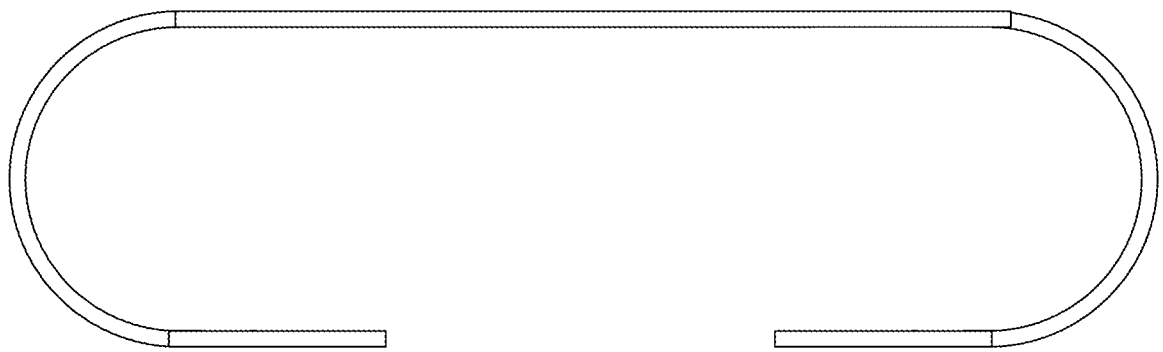
FIG. 3 illustrates a schematic structural diagram of performing bilateral folding to the display module.
Figure 4:
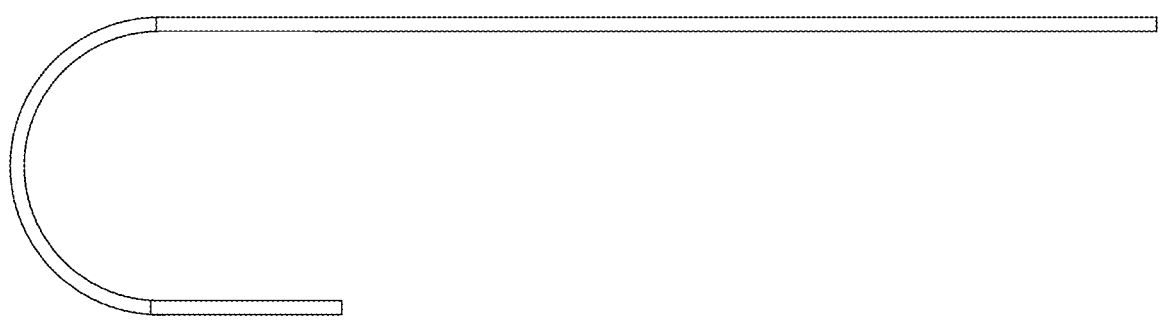
FIG. 4 illustrates a schematic structural diagram of performing unilateral folding to the display module.
Figure 5:
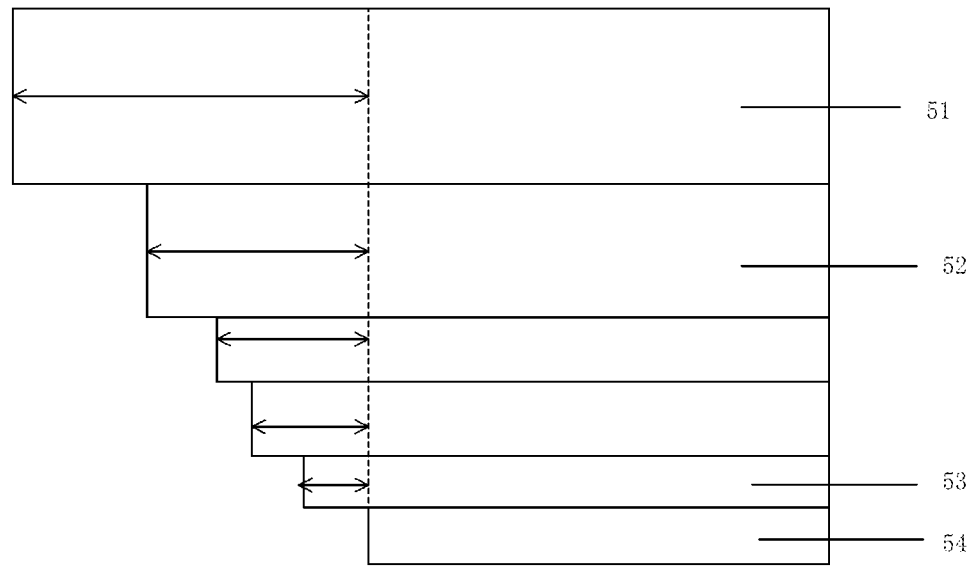
FIG. 5 illustrates a schematic diagram of the dislocation between the layers of the display module at a folded state in the related art.

The mechanical simulation of the flexible display panel is performed by the inventor on the bilateral folding (as shown in FIG. 3) and the unilateral folding (as shown in FIG. 4). According to the simulation results, it is found that the dislocation amount caused by bilateral folding between film layers is greater than the dislocation amount caused by unilateral folding between the film layers. For example, with reference to FIG. 5, the dislocation amount of a cover 51 relative to an optical adhesive film layer 52 increases from 229 μm of the unilateral folding to 268 μm of the bilateral folding, and the dislocation amount of a back film 53 relative to the supporting layer 54 increases from 386 μm of the unilateral folding to 525 μm of the bilateral folding. It can be seen that the dislocation amount generated by the folding or curling of the flexible display panel between the film layers cannot be ignored.

Figure 6:
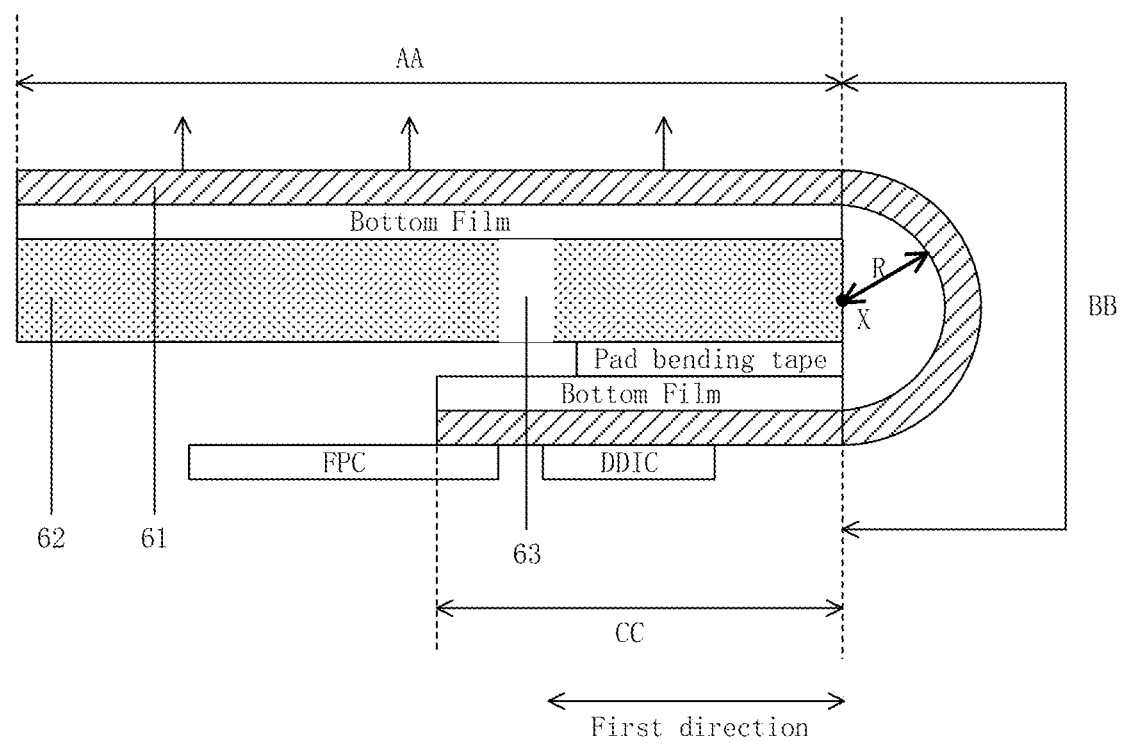
FIG. 6 illustrates a schematic diagram showing a sectional structure of the display module according to an embodiment of the present disclosure.

A display device is provided according to an embodiment of the present disclosure. Referring to FIG. 6, the display module includes: a flexible display panel 61, wherein the flexible display panel 61 includes an active area AA and a bending area BB located at a periphery of the active area AA; a supporting layer 62 disposed on one side of the active area AA, and the supporting layer 62 is disposed away from a light-emitting side of the flexible display panel 61: wherein, the supporting layer 62 is provided with an isolation groove 63 extending through the supporting layer 62 in a first direction, and the isolation groove 63 is disposed close to the bending area BB for isolating the supporting layer 62 on both sides of the isolation groove 63, and the first direction is perpendicular to a thickness direction of the supporting layer 62 and a bending axis X of the bending area BB.

When the axial direction of the bending axis X of the bending area BB is perpendicular to the section shown in FIG. 6, and a shape of the bending area BB is a semicircle, the bending axis X extends through the position of a center of the semicircle, as shown in FIG. 6.

The flexible display panel 61 may be a substrate of the organic light-emitting diode (OLED) structure or other flexible substrates, which is not specifically limited in the present disclosure.

In the present embodiment, the flexible display panel 61 in the active area AA may be folded or curled, which is not limited in the present disclosure.

A material of the supporting layer 62 may be a material, such as a metal, with the function of supporting, which is not limited in the present disclosure. A material of the metal is a stainless steel or a shape memory alloy and so on.

Because the flexible display panel 61 is soft, the supporting layer 62 may play a role in supporting the flexible display panel 61, which can improve the supporting of the display module, and protect the flexible display panel 61 at a same time.

Optionally, a thickness of the supporting layer 62 is greater than or equal to 30 μm, and less than or equal to 50 μm, which is not limited in the present embodiment.

The flexible display panel 61 may also include a binding area CC located at the periphery of the bending area BB. The binding area CC may be provided with a driver chip DDIC and an FPC and so on, as shown in FIG. 6. The bending area BB is configured for bending the binding area CC to the back of the flexible display panel 61.

The display module is provided by the present embodiment. By disposing the isolation groove 63 extending through the supporting layer in the first direction of the supporting layer 62, the supporting layers 62 on both sides of the isolation groove 63 are disconnected, so that the supporting layer 62 on both sides of the isolation groove 63 is discontinuous. Since the isolation groove 63 is disposed close to the bending area BB, the transport of the stress accumulated from the middle position to the edge of the supporting layer 62 close to the bending area BB may be blocked during the process of folding or curling the flexible display panel 61. The stress accumulation at the edge of the supporting layer 62 close to the bending area BB may be reduced. The dislocation amount of the edge of the supporting layer 62 close to the bending area BB relative to the flexible display panel 61 is reduced. On the one hand, the situation may be prevented where the supporting layer 62 dislocates too far away from the bending area BB, resulting in insufficient supporting force and collapse of the flexible display panel 61 at the corresponding position. On the other hand, the situation may be prevented where the supporting layer 62 dislocates too far facing to the bending area BB, resulting the supporting layer 62 to protrude and damaging the bending area BB. The poor display risks generated in the bending area BB may be reduced in the present disclosure, thereby reducing the poor display and improving the reliability of the display module.

The inventor carried out a mechanical simulation to the situation performing bilaterally folding to the display module provided in the present embodiment. By disposing an isolation groove 63 at the position close to the bending area BB on the supporting layer 62, the dislocation amount of the edge of the supporting layer 62 close to the bending area BB relative to the flexible display panel 61 reduces from 525 μm to 216 μm, which effectively reduces the dislocation amount of the supporting layer 62, and there are no collapse or damage in the bending area BB.

Figure 7:
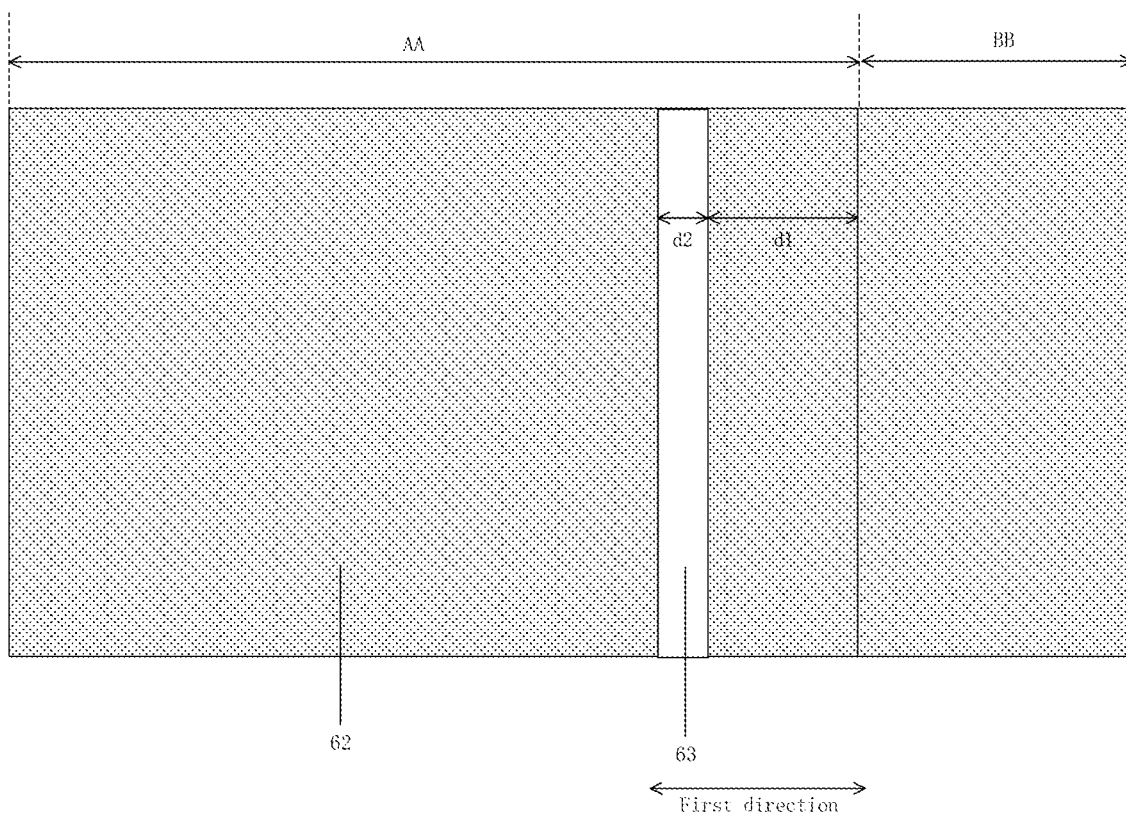
FIG. 7 illustrates a schematic diagram showing a plane structure of a supporting layer according to an embodiment of the present disclosure.

In an optional implementation, referring to FIG. 7, an extension direction of the isolation groove 63 is perpendicular to the first direction. As shown in FIG. 7, the shape of the isolation groove is strip shape, and the extension trajectory line is straight line. In practical application, the extension trajectory line of the isolation groove 63 may also be a curve, etc., which is not limited in the present embodiment. When the extension direction of the isolation groove 63 is perpendicular to the first direction, the difficulty of the manufacturing process may be reduced.

In an optional implementation, a filler may be disposed in the isolation groove 63, and an elastic modulus of the filler is less than an elastic modulus of the supporting layer 62. For example, a material of the filler may include a material with lower elastic modulus, such as silica gel, which is not limited in the present embodiment. By filling the material with lower elastic modulus in the isolation groove 63, the stress accumulation may be absorbed, and the stress at the edge position of the supporting layer 62 close to the bending area BB may be reduced, thereby reducing the dislocation amount of the edge of the supporting layer 62 close to the bending area BB.

In order to avoid excessive stress accumulation amount, and prevent forming edge segment difference, referring to FIG. 7, a distance d1 between the isolation groove 63 and the bending area BB is greater than or equal to 7 mm and less than or equal to 15 mm. In this way, the situation may not happen, where the distance between the isolation groove 63 and the bending area BB is too long, resulting in that inside the supporting layer 62 at a side of the isolation groove 63 close to the bending area BB, a large stress accumulation is still transported to the edge of the supporting layer 62 close to the bending area BB, and resulting in large dislocation amount. At the same time, the situation may not happen, where the isolation groove 63 is too close to the bending area BB, resulting that the flexible display panel 61 may not be affected by the edge segment difference.

Referring to FIG. 7, along the first direction of the flexible display panel 61, a width d2 of the isolation groove 63 is greater than or equal to 1 mm, it should be noted that, the size of the isolation groove 63 along the first direction may be as large as possible without affecting the supporting performance of the supporting layer 62, so as to avoid the contact between the supporting layers on both sides of the isolation groove 63 due to the dislocation between the film layers during the bending process of the display module. The specific size may be set according to the actual requirement, which is not limited in the present embodiment.

The edge of the supporting layer 62 close to the bending area BB may be retracted relative to an edge of the active area AA close to the bending area BB, and a retracted amount may be less than or equal to 0.5 mm. In this way, it can be ensured that the active area in the flexible display panel 61 has sufficient supporting, and the supporting layer 62 may not hinder the bending area BB.

The edge of the supporting layer 62 close to the bending area BB is protruded relative to the edge of the active area AA close to the bending area BB, and a protruded amount is less than or equal to 0.5 mm. In this way, it can be ensured that the active area in the flexible display panel 61 has sufficient supporting, and the supporting layer 62 may not hinder the bending area BB.

In an optional implementation, referring to FIG. 6, a bending radius R of the bending area BB is less than or equal to 400 μm, which is not limited in the present embodiment.

In a specific implementation, during using the display module, the protruded amount of the edge of the supporting layer 62 close to the bending area BB relative to the flexible display panel 61 may always be less than the bending radius of the bending area BB, ensuring that when the supporting layer 62 protrudes relative to the flexible display panel 61, the supporting layer 62 does not damage the bending area BB.

In the present embodiment, the display module further includes: a polarizer, an optical adhesive film layer and a packaging cover plate which are arranged in layer configuration on one side of the active area AA of the flexible display panel 61 away from the supporting layer 62, and the polarizer is disposed close to the active area AA. The display module further includes a back film, which is disposed between the active area AA of the flexible display panel 61 and the supporting layer 62. The polarizer may be a circular polarizer to reduce the reflectivity of the display module.

A display device is further provided by another embodiment in the present disclosure. The display device may include the display module according to any one of the embodiments.

It should be noted that, the display device in the present disclosure may be an electronic paper, a mobile phone, a tablet, a television, a laptop, a digital photo frame, a navigator and any other product or component with 2D or 3D display functions.

A display module and a display device are provided by the embodiment in the present disclosure. The display module includes: a flexible display panel, wherein the flexible display panel includes an active area and a bending area located at the periphery of the active area; a supporting layer disposed on one side of the active area, and the supporting layer is disposed away from a light-emitting side of the flexible display panel; wherein, the supporting layer is provided with an isolation groove extending through the supporting layer in the first direction, and the isolation groove is disposed close to the bending area for isolating the supporting layer on both sides of the isolation groove, and the first direction is perpendicular to a thickness direction of the supporting layer and a bending axis of the bending area. According to the technical solutions, by disposing isolation groove in the first direction of the supporting layer, the supporting layers on both sides of the isolation groove are disconnected. Since the isolation groove is disposed close to the bending area, the transport of the stress accumulated from the middle position to the edge close to the bending area may be blocked during the process of folding or curling the flexible display panel, and the dislocation amount of the edge of the supporting layer close to the bending area relative to the flexible display panel is reduced. On the one hand, the situation may be prevented where the supporting layer dislocates too far away from the bending area BB, resulting in insufficient supporting force and collapse of the flexible display panel at the corresponding position. On the other hand, the situation may be prevented where the supporting layer dislocates too far facing to the bending area BB, resulting the squeezing of the supporting layer and damaging the bending area BB. The poor risks generated in the bending area BB may be reduced in the present disclosure, thereby reducing the poor display and improving the reliability of the display module.

Various embodiments in the description are described in a progressive manner, each of the embodiments focuses on the differences with other embodiments. The same or similar parts of the various embodiments can be referred to each other.

Finally, it should also be noted that in this article, relational terms such as first and second are used only to distinguish one entity or operation from another without necessarily requiring or implying any such actual relationship or order between these entities or operations. Moreover, the term 'including', 'containing' or any other variant is intended to cover non-exclusive inclusion, so that the process, method, commodity or equipment that includes a series of elements includes not only those elements, but also other elements that are not clearly listed, or also includes the inherent elements of such process, method, commodity or equipment. Without more restrictions, the limited elements by the sentence 'includes one . . . ' do not exclude that there are other same elements in the process, method, commodity or equipment that include the elements.

A display module and display device provided by the present disclosure are introduced in detail. In this paper, the principle and embodiments of the present disclosure expounded with specific examples. The above description of the embodiments is only used to help understand the method and core idea of the present disclosure. At the same time, for the general technical personnel in the art, according to the idea of the present disclosure, there will be changes in the specific embodiments and application scope. In summary, the content of this specification should not be understood as the limitation of this disclosure.

The "an embodiment", "embodiments" or "one or more embodiments" mentioned in the disclosure means that the specific features, structures, or performances described in combination with the embodiment(s) would be included in at least one embodiment of the disclosure. Moreover, it should be noted that, the wording "in an embodiment" herein may not necessarily refer to the same embodiment.

Many details are discussed in the specification provided herein. However, it should be understood that the embodiments of the disclosure can be implemented without these specific details. In some examples, the well-known methods, structures, and technologies are not shown in detail so as to avoid an unclear understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present application may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present application, and not to limit them. Although the present application is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A display module, wherein the display module comprises:
   a flexible display panel, wherein the flexible display panel comprises an active area and a bending area located at a periphery of the active area; and
   a supporting layer disposed on one side of the active area, wherein the supporting layer is disposed away from a light-emitting side of the flexible display panel; the supporting layer is provided with an isolation groove extending through the supporting layer in a first direction, and the isolation groove is disposed close to the bending area for isolating the supporting layer on both sides of the isolation groove, and the first direction is perpendicular to a thickness direction of the supporting layer and a bending axis of the bending area;
   wherein a distance between the isolation groove and the bending area is greater than or equal to 7 mm and less than or equal to 15 mm;
   wherein the flexible display panel comprises a binding area located at a periphery of the bending area, and the bending area is configured for bending the binding area to a back of the flexible display panel.

2. The display module according to claim 1, wherein an extension direction of the isolation groove is perpendicular to the first direction.

3. The display module according to claim 1, wherein an extension trajectory line of the isolation groove is a curve.

4. The display module according to claim 1, wherein a filler is disposed in the isolation groove, and an elastic modulus of the filler is less than an elastic modulus of the supporting layer.

5. The display module according to claim 4, wherein a material of the filler comprises silica gel.

6. The display module according to claim 1, wherein a width of the isolation groove is greater than or equal to 1 mm along the first direction of the flexible display panel.

7. The display module according to claim 1, wherein an edge of the supporting layer close to the bending area is retracted relative to an edge of the active area close to the bending area, and a retracted amount is less than or equal to 0.5 mm.

8. The display module according to claim 1, wherein an edge of the supporting layer close to the bending area is protruded relative to an edge of the active area close to the bending area, and a protruded amount is less than or equal to 0.5 mm.

9. The display module according to claim 1, wherein a thickness of the supporting layer is greater than or equal to 30 μm, and less than or equal to 50 μm.

10. The display module according to claim 1, wherein a material of the supporting layer is a metal, and a material of the metal is a stainless steel or a shape memory alloy.

11. The display module according to claim 1, wherein a bending radius of the bending area is less than or equal to 400 μm.

12. A display device, wherein the display device comprises the display module according to claim 1.

13. The display device according to claim 12, wherein an extension direction of the isolation groove is perpendicular to the first direction.

14. The display device according to claim 12, wherein an extension trajectory line of the isolation groove is a curve.

15. The display device according to claim 12, wherein a filler is disposed in the isolation groove, and an elastic modulus of the filler is less than an elastic modulus of the supporting layer.

16. The display device according to claim 15, wherein a material of the filler comprises silica gel.

17. The display device according to claim 12, wherein a width of the isolation groove is greater than or equal to 1 mm along the first direction of the flexible display panel.

18. The display device according to claim 12, wherein an edge of the supporting layer close to the bending area is retracted relative to an edge of the active area close to the bending area, and a retracted amount is less than or equal to 0.5 mm.

* * * * *